Dec. 23, 1958   W. H. EDGE ET AL   2,865,393
VALVE

Filed Aug. 4, 1954   3 Sheets-Sheet 1

INVENTORS
W. H. EDGE
R. G. HILLIER
BY
Hudson and Young
ATTORNEYS

Dec. 23, 1958　　　W. H. EDGE ET AL　　　2,865,393
VALVE
Filed Aug. 4, 1954　　　　　　　　　　　3 Sheets-Sheet 2
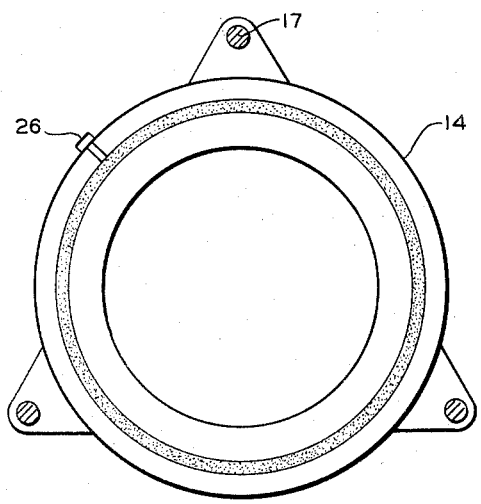
FIG. 2.
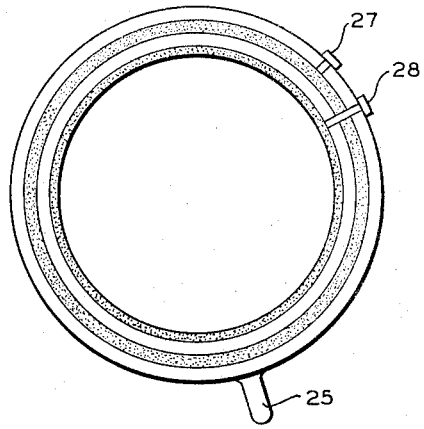
FIG. 3.
FIG. 5.
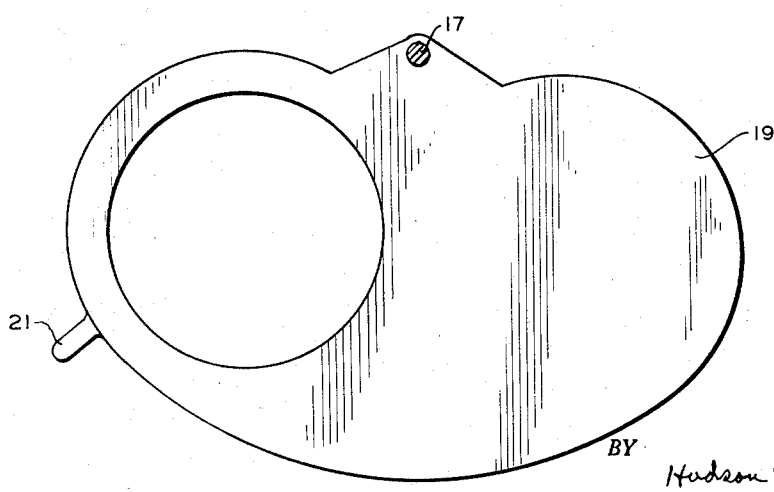
INVENTORS
W. H. EDGE
R. G. HILLIER
BY
Hudson & Young
ATTORNEYS Dec. 23, 1958  W. H. EDGE ET AL  2,865,393
VALVE Filed Aug. 4, 1954  3 Sheets-Sheet 3

INVENTORS
W.H. EDGE
R.G. HILLIER
BY Hudson and Young

ATTORNEYS

United States Patent Office 2,865,393
Patented Dec. 23, 1958

2,865,393

VALVE

William H. Edge, Severn Beach, near Bristol, and Ronald G. Hillier, Sea Mills, Bristol, England, assignors to Phillips Petroleum Company, Bartlesville, Okla., a corporation of Delaware Application August 4, 1954, Serial No. 447,707

5 Claims. (Cl. 137—246)

This invention relates to goggle-type valves. In one of its more specific aspects, it relates to a goggle valve for cutting off the flow of hot gases in a large diameter pipe. In another of its more specific aspects, it relates to a goggle-type valve adapted to resist warpage at elevated temperatures.

In the operation of a furnace carbon black plant, the effluent from the furnace, containing carbon black suspended in hot gas, is conducted through a length of pipe exposed to the atmosphere for the purpose of cooling the gas prior to the steps of separating the carbon black from the furnace effluent gases. These atmospheric cooling pipes are usually constructed of large diameter pipe so as to reduce the velocity of the gases flowing therethrough and usually exhaust the gases into a manifold or header in common with several furnaces. It is occasionally necessary to take one or more of the furnaces out of operation for repairs or for other reasons and thus it is necessary to have a valve in each atmospheric cooling pipe so that when a furnace is removed from service, it may be isolated from the remaining furnaces in the plant.

The valves which are employed for stopping the flow of gas through these atmospheric cooling pipes are required to operate at elevated temperatures because the gases will be cooled in the atmospheric cooling pipes only to the extent required in the subsequent operational steps and thus the gases in the atmospheric cooling pipes are usually only cooled to about 700° F. At these high temperatures, valves of the prior art have been found to be unsatisfactory. Goggle valves of the prior art have been found to be subject to warpage at the operating temperatures and to sticking, because of the difficulty of maintaining a lubricant in the valves at these high temperatures. Ordinary plug valves are not practical in this service because of the great weight of such valves on large diameter pipes, while gate valves are prone to accumulate deposits of carbon black in open position, making complete closure difficult or impossible.

Each of the following objects will be attained in at least one aspect of the invention.

It is an object of this invention to provide a goggle valve adapted for positive sealing in high temperature operation.

It is another object to provide a goggle valve having a simplified means for sealing said valve.

It is another object to provide a valve that is light in weight and simple to construct.

It is another object to provide a valve which can be manipulated with little effort.

Other objects and advantages will be apparent to one skilled in the art upon reading this disclosure, including the attached drawing.

In the drawing,

Figure 2 is a section taken on the line A—A of the Figure 1.

Figure 3 is a section taken along B—B of Figure 1.

Figure 5 is an end elevation of the valve plate of the invention.

Figure 1:
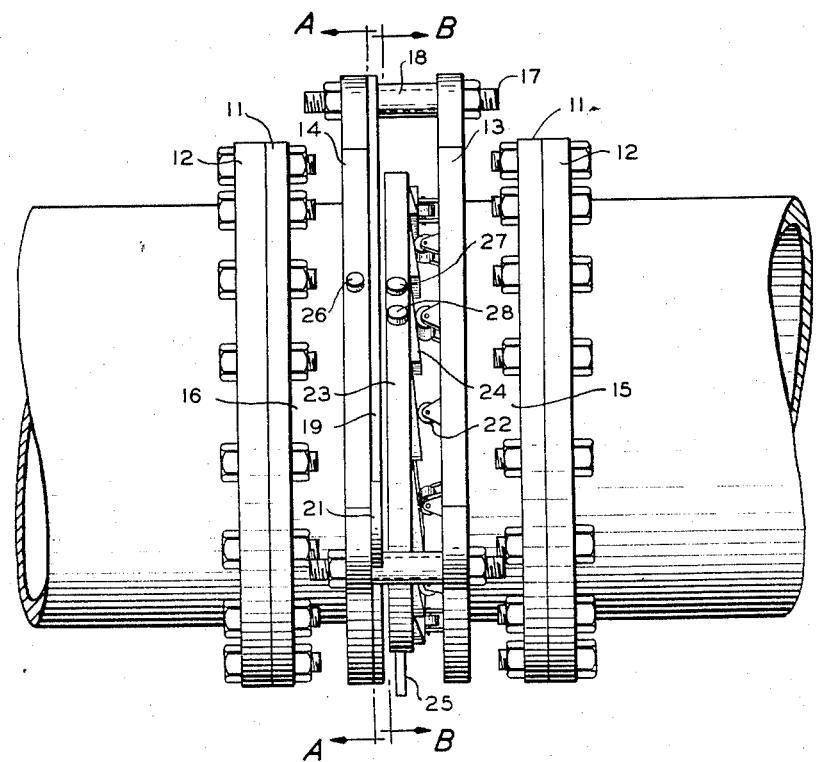
Figure 1 is a side elevation of the valve of the present invention.

Referring now to the drawing of Figure 1, a preferred embodiment of our valve is shown as attached to an atmospheric cooling pipe or casing by flanges 11 and 12. Tie plates 13 and 14 are welded to the short sections of pipes 15 and 16 and are secured together by tie bolts 17 and spacer bushings 18, spaced 120° apart around the circumference of the casing. Valve plate 19 is pivotally connected to one of the tie bolts. Valve plate 19 has a projection 21 which serves as an operating handle. Tie plate 13 has a plurality of rollers 22 secured to its inner face. Movable sleeve 23 having a projecting handle 25 is situated between tie plate 13 and valve plate 19. A plurality of cams 24 are attached to the face of sleeve 23 and in contact with rollers 22 on tie plate 13.

Tie plate 14 has a packing means in contact with valve plate 19 and sleeve 23 has a packing means on its inner surface in contact with the casing and on its face in contact with valve plate 19. The packing means in tie plate 14 and sleeve 23 are contained in suitable grooves in these members and are lubricated through lubricator buttons 26, 27 and 28.

The valve is operated in the following manner, starting from the valve being in closed position. Sleeve 23 is rotated slightly about the casing by tapping projection 25 downwardly so as to relieve the pressure of the cams and rollers forcing sleeve 23 into contact with the valve plate 19. Valve plate 19 can now be moved to open position by rotating the valve plate on the pivot of tie bolt 17. The valve is now secured in open position by rotating sleeve 23 about the casing so that sleeve 23 is forced into contact with valve plate 19 by the action of rollers 22 on cams 24.

Figure 2 shows the location of the packing in tie plate 14 and illustrates a preferred method for lubricating this packing.

Figure 3 shows the location of the packing on the face of sleeve 23 and the packing on the inner surface of sleeve 23 and illustrates a preferred method for lubricating these packing means.

Figure 4:
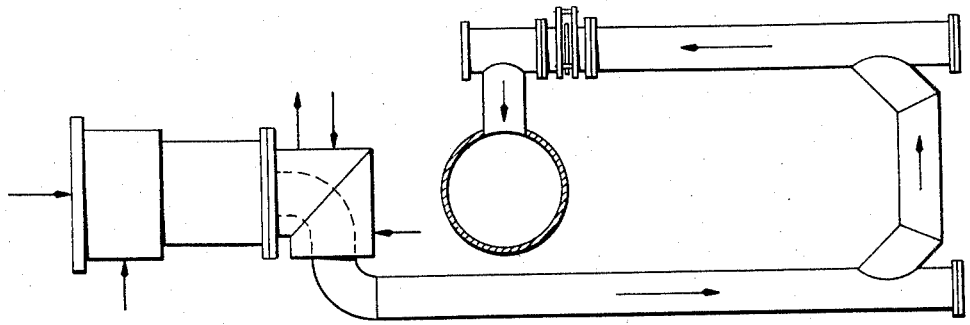
Figure 4 is a schematic view of a carbon black furnace and atmospheric cooling pipe wherein the valve of this invention is employed.

Figure 4 illustrates a preferred method of employing the valve of this invention in a carbon black plant and shows the valve installed at the coolest point at the atmospheric cooling pipe where the temperature is about 700° F.

Figure 6:
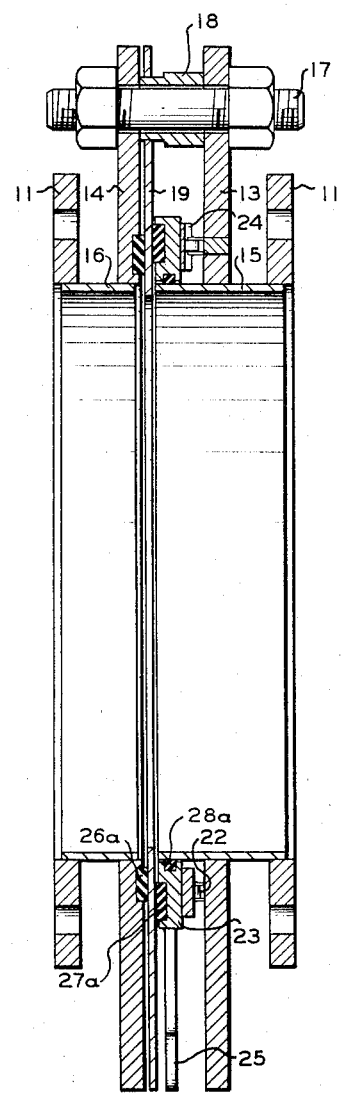
Figure 6 is an axial cross-sectional view of the valve of Figure 1.

Figure 6 shows the relationship of the rotatable sleeve 23 to pipe section 15, valve plate 19, rollers 22 and cams 24. The packing means on the inner surface of sleeve 23 maintains sealing, sliding contact with pipe section 15.

In the valve of this invention, warpage of the valve plate and subsequent leakage of the valve are prevented through the action of the rollers and cams in maintaining constant compression on the sleeve ring substantially throughout the entire periphery of the ring. Although the valve of this invention is particularly adapted to service at high temperatures, it will be obvious to those skilled in the art that the valve can be advantageously employed in other services.

Variations and modifications are possible within the scope of the present invention, the essence of which is an improved goggle valve adapted for service at elevated temperatures wherein positive sealing means prevent leakage resulting from heat warping of the valve plate.

We claim:

1. A goggle valve comprising a pair of casing sections aligned on a common axis and spaced apart; a valve plate movable in a transverse plane between the casing ends; a first ring secured to the end of a first of said casings; a first packing means incorporated in said ring for sealing engagement with said valve plate; a second ring secured to the second casing and spaced from said end; a plurality of bolts securing said first and second rings in spaced relationship; a third ring movably mounted on the second casing between the second ring and the end of said casing; a second packing means incorporated in said third ring for sealing engagement with said valve plate; a third packing means incorporated in said third ring for sealing engagement with said casing; a plurality of cams mounted on said third ring opposite said second packing means; a plurality of rollers mounted on said second ring in contact with said cams; means for lubricating said first, second and third packing means; and means for rotating said third ring whereby said cams and rollers force said third ring and second packing means into sealing engagement with said valve plate.

2. A goggle valve comprising a pair of casings having adjacent open ends aligned on a common axis and spaced apart; a goggle plate adapted to slide between the adjacent open ends of said pair of aligned casings; a first fixed sleeve on one of said casings adjacent its open end and in sealing contact with said goggle plate; a movable sleeve on the other casing adjacent its open end and having a continuous series of cam means attached to the side opposite the open casing end; a series of roller means in fixed relationship to said casing and in contact with said cams; and means to rotate said movable sleeve and cams in contact with said rollers so as to force said sleeve into rotating sealing contact with said goggle plate.

3. A goggle valve comprising a pair of aligned casing sections open at their adjacent ends and spaced apart on a common axis; a valve plate adapted to slide between said casing sections and having an opening adapted so as to align with the casing openings; a first packing means sealing said valve plate and a first of said pair of casing sections; means for lubricating said first packing means; a second packing means rotatable about the second of said casing sections for sealing said valve plate and the second of said pair of casing sections and having a plurality of cam means secured thereto; means for lubricating said second packing means; and a plurality of roller means in contact with said cams and secured to said second casing section so as to move said second packing into rotating contact with said valve plate when said second packing is rotated.

4. A goggle valve in an atmospheric cooling line of a furnace carbon black plant comprising a pair of casing sections spaced apart on a common axis and open at adjacent ends; a valve plate adapted so as to slide between the open ends of said casing sections and having an opening adapted so as to align with the casing openings; a fixed packing means for sealing a first section of said pair of casing sections and said valve plate; means for lubricating said fixed packing means; a movable packing means having a plurality of cam means secured thereto for sealing the second section of said pair of casing sections and said valve plate; means for lubricating said movable packing means; and a plurality of roller means secured to said second casing section and in contact with said cams so as to rotate said movable packing to and from said valve plate when said movable packing means is rotated about said second section of said casings.

5. A goggle valve comprising a pair of casing sections spaced apart on a common axis and open at adjacent ends; a first sleeve ring secured to the end of a first of said casing sections and having a first packing means adjacent the open casing end; means for lubricating said first packing means; a valve plate movably positioned for slidable contact with said packing means having an opening adapted to align with the casing opening; a second sleeve ring secured to the second casing section and spaced from the end adjacent said valve plate; a plurality of roller means secured to said second sleeve ring; means for maintaining said rings in spaced relationship to each other; a third sleeve ring movably located between said second sleeve ring and said spaced casing section end; a second packing means on the inner surface of said third sleeve ring; means for lubricating said second packing means; a third packing means on said third sleeve ring adjacent said casing section end; means for lubricating said third packing means; a plurality of cam means on said third sleeve ring in contact with said roller means; means for rotating said third sleeve ring into contact with said valve plate; and means for sliding said valve plate when said third sleeve ring is out of contact with said valve plate.

References Cited in the file of this patent

UNITED STATES PATENTS

| | | |
|---|---|---|
| 1,613,138 | Seymour | Jan. 4, 1927 |
| 1,727,644 | Holmquist | Sept. 10, 1929 |
| 1,727,677 | Siebert | Sept. 10, 1929 |
| 2,035,548 | Johnson | Mar. 31, 1936 |
| 2,046,759 | Wheaton | July 7, 1936 |
| 2,156,967 | Brosius | May 2, 1939 |
| 2,455,658 | Dons | Dec. 7, 1948 |